US011829782B2

(12) United States Patent
Ragotte

(10) Patent No.: US 11,829,782 B2
(45) Date of Patent: Nov. 28, 2023

(54) SYSTEM AND METHOD FOR CONTEXTUAL NAVIGATION IN APPLICATIONS

(71) Applicant: Shopify Inc., Ottawa (CA)

(72) Inventor: Katharine Ragotte, Milton (CA)

(73) Assignee: SHOPIFY INC., Ottawa (CA)

(\*) Notice: Subject to any disclaimer, the term of this patent is extended or adjusted under 35 U.S.C. 154(b) by 0 days.

(21) Appl. No.: 17/307,492

(22) Filed: May 4, 2021

(65) Prior Publication Data
US 2022/0357961 A1    Nov. 10, 2022

(51) Int. Cl.
*G06F 9/445*    (2018.01)

(52) U.S. Cl.
CPC ...... *G06F 9/44521* (2013.01); *G06F 9/44526* (2013.01)

(58) Field of Classification Search
None
See application file for complete search history.

(56) References Cited

U.S. PATENT DOCUMENTS

| | | | | |
|---|---|---|---|---|
| 6,297,819 B1* | 10/2001 | Furst | ......... | G06F 3/00 |
| | | | | 715/205 |
| 7,555,722 B2* | 6/2009 | Karatal | ......... | G06F 16/954 |
| | | | | 715/765 |
| 9,009,602 B2* | 4/2015 | Chapman | ......... | G06F 16/954 |
| | | | | 715/708 |
| 9,665,547 B1* | 5/2017 | Eidelson | ......... | G06F 16/954 |
| 10,127,321 B2* | 11/2018 | Aravamudhan | ..... | G06F 16/9535 |
| 10,162,473 B2* | 12/2018 | Peterson | ......... | G06F 9/451 |
| 11,010,446 B2* | 5/2021 | Jaiswal | ......... | G06N 5/02 |
| 11,756,107 B1* | 9/2023 | Sigler | ......... | G06Q 30/0643 |
| | | | | 705/27.2 |
| 2005/0177676 A1* | 8/2005 | Karatal | ......... | G06F 16/954 |
| | | | | 711/100 |
| 2008/0208862 A1* | 8/2008 | Winter | ......... | G06F 16/2343 |
| 2010/0042718 A1* | 2/2010 | Morris | ......... | G06Q 10/063 |
| | | | | 709/224 |
| 2011/0320443 A1* | 12/2011 | Ray | ......... | G06F 16/951 |
| | | | | 707/723 |
| 2012/0144281 A1* | 6/2012 | Schechter | ......... | G06F 16/9535 |
| | | | | 707/769 |
| 2017/0220215 A1* | 8/2017 | Wu | ......... | G06F 3/04845 |
| 2018/0247079 A1* | 8/2018 | Ollikainen | ......... | G06F 21/6263 |

\* cited by examiner

*Primary Examiner* — Umut Onat

(74) *Attorney, Agent, or Firm* — Smart & Biggar LP

(57) ABSTRACT

Methods and systems for providing contextual navigation on a software platform are described. A current context of a current page is determined, where the current page is for managing one or more aspects of a service instance on the software platform. The service instance is associated with a user account. It is determined, based on a historical activity pattern associated with the user account, that a particular web resource of an application is relevant to the current context. A contextual reference to the particular web resource is generated. The contextual reference is selectable to provide navigation to the particular web resource within the application. The contextual reference is displayed in the current page.

21 Claims, 7 Drawing Sheets

E-Commerce Platform

🔍 Search

- 🏠 Home
- 📋 Orders
- 🏷 Products
- 👤 Customers
- 📊 Reports
- 💲 Discounts
- ▦ Apps SALES CHANNELS
- 🌐 Online Store
- ▯ Mobile App View all channels ⚙ Settings (JG) John's Apparel / Jonny B. Good

Good afternoon, Jonny B.

Here's what's happening with your store today.

Today's total sales    Today's visits
$98.00             1

● Update your Platform Payments tax details
We require additional information to verify your identity.
[Update tax details]

● Advanced Cash on Delivery has been deactivated for your store
[See why]

[All channels ▾]    [Today ▾]

TOTAL SALES
$98.00

$125
$75
$25

12am    8pm    4pm    11pm
                            Jun 1
                            2 orders

TOTAL SALES BY CHANNEL    Jun 1

Online Store        View dashboard
$0.00               0 orders

Mobile app
$0.00               0 orders

Shopify POS (126 York St.)
$0.00               0 orders

FIG. 4

SYSTEM AND METHOD FOR CONTEXTUAL NAVIGATION IN APPLICATIONS

FIELD

The present disclosure is related to systems and methods enabling user navigation between a software platform and an application that is accessible from the software platform. In particular, the present disclosure is related to contextual navigation enabling navigation from the software platform to a web resource within the application.

BACKGROUND

A software platform may host multiple service instances, and provide services and functionalities for each service instance. A user of the platform may use an administrator, provided by the platform, to manage different aspects of a service instance. In some cases, a web resource may be provided by an application to provide particular functionality for a service instance. The application may be a software extension (sometimes referred to as a plugin) that is accessible from the administrator on the platform. When a user wishes to access a desired web resource from the administrator, a user may be required to navigate through the application to find the desired web resource.

An example of a software platform is an e-commerce platform. In the context of e-commerce, the service instance that is managed on the platform may be a store. A store may have various aspects (or channels) for communicating with and/or selling goods and services to its customers, and an online store may be an aspect of a store that is hosted by the e-commerce platform. The online store may be an application (e.g., a store manager application) that is hosted on the e-commerce platform, and the e-commerce platform may be used to manage at least this aspect of the store. In some examples, one or more aspects of the store may be managed using the e-commerce platform, and there may be other aspects of the store that may be managed outside of the e-commerce platform. In particular, the e-commerce platform enables a user, such as a merchant, to manage different aspects of the online store. A user may use an application, accessed via an administrator on the platform, to access a particular web resource for managing the online store. Each time the user wishes to access the web resource, the user may be required to navigate through the administrator to find the application for the desired web resource, load up the application and navigate through the application to access the web resource. However, navigation through the administrator and loading up the application can be time consuming and/or an inefficient use of computing resources. Further, if the user manages multiple online stores on the platform, this process may need to be repeated for each online store.

SUMMARY

In various examples, the present disclosure describes methods and systems that enable contextual navigation between a software platform and an application providing a web resource. Examples of the present disclosure enable more efficient navigation between the software platform and the application.

A user on the software platform may manage one or more aspects of a service instance (e.g., a store) via an administrator provided by the software platform. The user may wish to access a desired web resource that is provided by an application, for example to access a functionality for managing the one or more aspects of the service instance. Conventionally, the user may be required to load up the application against the service instance and navigate through a sequence of pages in the application to reach the desired web resource. In some cases, even before loading up the application, the user may first be required to navigate through the administrator to find the application for the desired web resource. For example, in some existing conventional software platforms, when a user desires a particular web resource, the user is required to navigate to a listing of all applications that is accessible to the user's account. If there is a large number of accessible applications associated with the account, significant time and resources (e.g., memory resources) may be consumed to load up this listing. Then the user is required to find the relevant application from the listing, then load up the application (again using up computing resources such as memory and processor power). The user must then navigate through the application to the desired web resource. When the user manages multiple service instances (or multiple aspects of a service instance) on the software platform, this process may need to be repeated each time, which can be time-consuming and/or tedious, and which can be an inefficient use of computing resources both on the software platform and on the device used by the user to navigate the software platform.

Further, when the application is loaded, the user may need to input information to the application that the user had previously already inputted on the software platform. The duplication of user input can be tedious and/or prone to error.

The present disclosure provides a solution that enables more efficient navigation, by automatically and dynamically generating a contextual reference to navigate to the web resource (e.g., an inner page) within the application. The contextual reference may enable the user to directly navigate to the desired web resource from the user's current page on the administrator. This may provide more seamless and efficient navigation, thus improving the user's experience on the software platform.

In some examples, the historical activity pattern of the user may be used to automatically determine that a web resource of an application is relevant to the user's current context. The contextual reference may be automatically generated on this basis, thus anticipating the user's needs and providing improved navigation. In this way, a user may more quickly navigate to a relevant web resource. Conveniently, by so allowing a user to navigate more directly, consumption of computing resources for providing navigation functionality may be reduced. For example, less memory and/or processing resources may be consumed. Additionally or alternatively, in this way, a navigation between the platform and the application may be simplified for the user. Put another way, an improved, potentially more efficient, user interface may be provided.

As noted above, examples of the present disclosure provide technical improvements at least because the software platform can more efficiently provide navigation to the application (and vice versa), without wasting resources (e.g., memory resources, processing power, processing time, etc.) on loading up and traversing intermediary pages before reaching the desired web resource. Information (e.g., contextual information) may also be communicated more efficiently between the software platform and application, which may result in a reduction in the number of function calls and queries.

In some example aspects, the present disclosure describes a method for providing contextual navigation on a software platform. The method includes: determining a current context of a current page for managing one or more aspects of a service instance on the software platform, the service instance being associated with a user account; determining, based on a historical activity pattern associated with the user account, that a particular web resource of an application is relevant to the current context; generating, by the software platform, a contextual reference to the particular web resource, the contextual reference being selectable to provide navigation to the particular web resource within the application; and displaying the contextual reference in the current page.

In any of the preceding examples, the method may include: determining, based on a plurality of application attributes associated with a respective plurality of applications registered on the software platform, that an application attribute associated with a given application is relevant to the current context; and responsive to determining that the application attribute associated with the given application is relevant to the current context, providing an indication that the given application is relevant to the current context.

In any of the preceding examples, the contextual reference may be further selectable to install the given application against the service instance.

In any of the preceding examples, generating the contextual reference may include: generating a direct uniform resource identifier (URI) or uniform resource locator (URL) link to access the particular web resource.

In any of the preceding examples, the URI or URL link may be generated using a template associated with the application, by populating the template using contextual information about the current context.

In any of the preceding examples, the contextual reference may be configured to provide contextual information about the current context to the application, wherein the application is to navigate to the particular web resource responsive to the contextual information.

In any of the preceding examples, the current context of the current page may be determined to include: a current product; a current order; a current customer profile; a current marketing campaign; specifications of a current product; fulfillment information for a current order; or at least one previous action performed on the current page.

In any of the preceding examples, the contextual reference may be generated to provide navigation to the particular web resource, the navigation being limited to the determined current context.

In any of the preceding examples, the method may include: determining the historical activity pattern associated with the user account by identifying a user group associated with the user account and determining the historical activity pattern associated with the user group using the historical activity pattern associated with the user account.

In any of the preceding examples, the method may include: determining the historical activity pattern associated with the user account by identifying historical navigation associated with the user account over a defined time period.

In some example aspects, the present disclosure describes a system for providing contextual navigation on a software platform. The system includes: a processor in communication with storage. The processor is configured to execute instructions from the storage to cause the system to: determine a current context of a current page for managing one or more aspects of a service instance on the software platform, the service instance being associated with a user account; determine, from a historical activity pattern associated with the user account, that a web resource of an application is relevant to the current context; generate a contextual reference to the identified web resource, the contextual reference being selectable to provide navigation to the web resource within the application; and display the contextual reference in the current page.

In some examples, the software platform may be an e-commerce platform.

In some examples, the processor may be configured to execute instructions to cause the system to perform any of the methods described herein.

In some example aspects, the present disclosure describes a computer-readable medium storing instructions that, when executed by a processor of a system, cause the system to: determine a current context of a current page for managing one or more aspects of a service instance on a software platform, the service instance being associated with a user account; determine, from a historical activity pattern associated with the user account, that a web resource of an application is relevant to the current context; generate a contextual reference to the identified web resource, the contextual reference being selectable to provide navigation to the web resource within the application; and display the contextual reference in the current page.

In some examples, the computer-readable medium, when executed by the processor, may cause the system to perform any of the methods described herein.

BRIEF DESCRIPTION OF THE DRAWINGS

Reference will now be made, by way of example, to the accompanying drawings which show example embodiments of the present application, and in which:

FIG. 4 is an example homepage of an administrator, which may be provided by the e-commerce platform of FIG. 3.

Similar reference numerals may have been used in different figures to denote similar components.

DESCRIPTION OF EXAMPLE EMBODIMENTS

The present disclosure describes examples in which a software platform is an e-commerce platform, and in which service instances are stores and online stores are aspects of stores that are managed using the platform. However, it should be understood that the e-commerce platform is only one possible example of a software platform and is not intended to be limiting. It should be understood that the present disclosure may be implemented in other contexts, and is not necessarily limited to implementation in an e-commerce platform.

Figure 1:
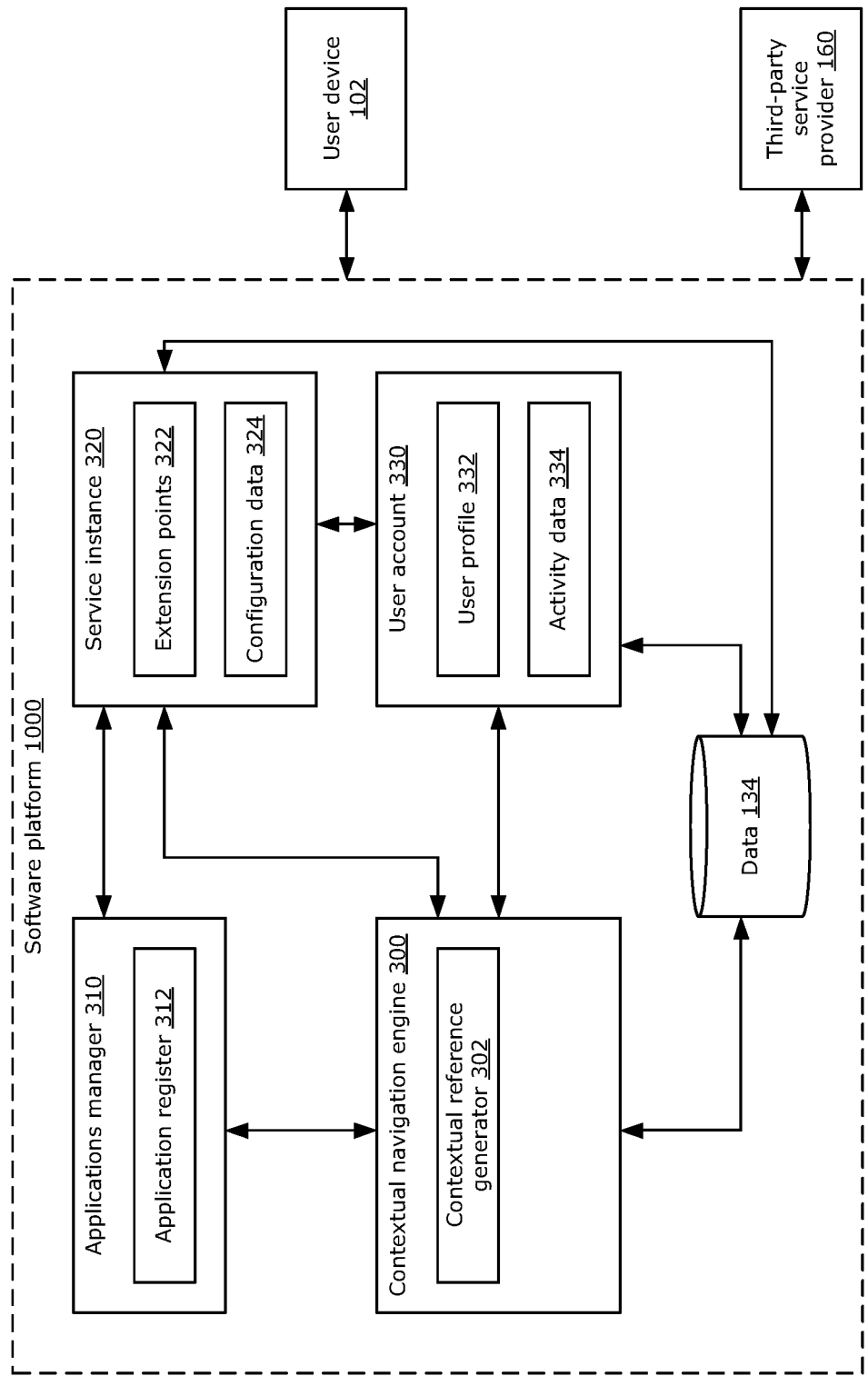
FIG. 1 is a block diagram of an example software platform, in which examples described herein may be implemented.

FIG. 1 is a simplified block diagram illustrating an example software platform 1000. In some examples, the software platform 1000 may be referred to as a software as a service (SaaS) platform.

The software platform 1000 may host one or more aspects of one or more services instances 320. For clarity, an "aspect" of a service instance 320 may be a software application that is part of the service instance 320, a software function of the service instance 320, or the service instance 320 itself. In some examples, the software platform 1000 may be used to manage one or more aspects of the service instance 320 hosted on the software platform 1000, however there may be one or more other aspects of the service instance 320 that is managed outside of the software platform 1000. For simplicity, FIG. 1 illustrates a single aspect of a single service instance 320, however it should be understood that this is not intended to be limiting. Further, it should be understood that references in the present disclosure to the service instance 320 may also refer to an aspect of the service instance 320 that is managed using the software platform 1000 (and vice versa). The software platform 1000 provides each service instance 320 with access to various online functionalities and resources. Each service instance 320 may be identified by a respective service instance ID, which may be unique at least within the software platform 1000. A user may interact with the software platform 1000, via a user device 102, to manage an aspect of a service instance 320. An administrator (not shown in FIG. 1) provided by the software platform 1000 enables a user (e.g., a client of the software platform 1000) to manage an aspect of a service instance 320 and to access functionalities and resources. In some examples, the software platform 1000 may be an e-commerce platform, services instances 320 may be stores, and the aspects of the service instances 320 hosted on the e-commerce platform may be online stores. A user may be a merchant who uses the e-commerce platform to manage an online store. Functionalities and resources provided by the e-commerce platform may include resources relevant to operations of an online store (e.g., inventory management, order fulfillment, shipping, etc.).

Each service instance 320 may include one or more extension points 322. An extension point 322 enables access to a web resource provided by an application, for example to provide a functionality to the service instance 320. During execution of an aspect of a service instance 320, the extension point 322 may be called (or invoked) when the web resource provided by the associated application is needed. For example, a user may use an administrator provided by the software platform 1000 to manage an aspect of the service instance 320, and an application may be called when a user selects a reference to the application (e.g., a link to call the application) provided in the administrator.

Each service instance 320 may also include a respective set of configuration data 324. The configuration data 324 includes information related to how the service instance 320 is set up. In the example where an aspect of a service instance 320 is an online store, the configuration data 324 may include data related to, for example: number of warehouses, ship-from or ship-to locations, product pages, etc. The configuration data 324 may also include data about the operation of the aspect of the service instance 320. In the example where an aspect of a service instance 320 is an online store, the configuration data 324 may include operational data related to, for example: inventory size or movement, current and historical number of customers, current and historical sales, current and historical marketing campaigns, customer list, etc. The configuration data 324 may also include information about the applications that have been installed against the service instance 320 and that can be called by the service instance 320.

The software platform 1000 in this example includes an applications manager 310, which may be used to manage applications that can be called by a service instance 320 via the software platform 1000. The applications may include first-party applications that are developed by an operator of the software platform 1000, and may also include third-party applications that are developed by a third-party service provider 160. A called application may be executed on the software platform 1000 (e.g., in the case of a first-party application), or may be executed on an external third-party server or platform (e.g., in the case of a third-party application).

The application manager 310 in this example includes an application register 312, which tracks the applications that are registered with the software platform 1000 and that can be called from the software platform 1000. For example, a third-party service provider 160 may register a third-party application with the software platform 1000. First-party applications, which may be native to the software platform 1000 (or developed by an operator of the software platform 1000) may be automatically registered with the software platform 1000. Each registered application may be associated with a unique application ID in the application register 312. The application register 312 may also associate one or more application attributes with a registered application. An application attribute may include, for example, an indication of a web resource or a functionality provided by the application, an application type, an application category, an application definition (e.g., a definition of input(s) accepted by the application and/or a definition of output(s) generated by the application), a template for generating a reference (e.g., a contextual reference) to call the application, etc. A web resource provided by an application may be any resource that is accessible via an online network (e.g., an online page, an online file, an online service, etc.). A web resource may be static (e.g., a static document) or may be dynamic (e.g., a document whose content changes). A functionality that is provided by an application may be accessed by accessing an associated web resource (e.g., a functionality to send a bulk communication may be accessed by accessing an online page to compose the communication).

Applications that are registered on the application register 312 may be searchable on the software platform 1000, so that a user may search for and install a registered application against a service instance 320. Installation of an application against a service instance 320 may result in a corresponding extension point 322 for that application being added to the service instance 320 and the configuration data 324 being updated accordingly.

In some examples, an application may not need to be registered on the application register 312. For example, a user may wish to access a web resource that is provided by a third-party application that has not been registered with the software platform 1000. The user may install the application against a service instance 320 and the application may be called during execution of the service instance 320, without the application being registered on the application register 312.

Each user of the software platform 1000 may be associated with a respective user account 330. A user account 330 may be associated with one or more service instances 320 (each having one or more aspects managed on the software platform 1000), and each service instance 320 may be associated with one or more user accounts 330. For simplicity, only one service instance 320 and one user account 330 are shown in FIG. 1. However, it should be understood that there may be multiple independent instances of the service instance 320 and/or user account 330.

The user account 330 may include a user profile 332 and activity data 334. The user profile 332 may include information about user characteristics, such as age (or age group), address (or geographical region), gender, preferences, etc. The user profile 332 may also include information about one or more service instances 320 (each having one or more aspects) associated with the user account 330. For example, the user profile 332 may include the service instance ID of service instance(s) associated with the user account 330 and/or a category of each service instance associated with the user account 330. The user profile 332 may also include information about permissions or authorizations associated with the user account 330. For example, in the example where an aspect of a service instance 320 is an online store, the user profile 332 may indicate whether the user account 330 is for a store owner (who may have authorization to make changes to the configuration data 324 of the online store) or for a store employee (who may not have authorization to make changes to the configuration data 324).

The user account 330 may also include activity data 334. The activity data 334 may include information about historical activity on the software platform 1000 that is associated with the user account 330. Historical activity may be tracked over a defined period of time (e.g., activity in the last month, activity in the last year), or a variable period of time (e.g., activity since the user account 330 was created on the software platform 1000). The activity data 334 may include information about how the user associated with the user account 330 manages and interacts with one or more aspects of associated service instance(s) 320 on the software platform 1000. The activity data 334 may include, for example, page(s) of an administrator the user accesses to manage an aspect of a service instance 320, web resource(s) and/or application(s) the user accesses to manage an aspect of the service instance 320 and/or sequence of operations the user performs to manage an aspect of the service instance 320. For example, in the example where an aspect of a service instance 320 is an online store, the activity data 334 may include historical activity performed by the user to manage the online store. For example, historical activity may include a sequence of operations such as the user accessing an orders page, filtering the orders page to view only unfulfilled orders, accessing a web resource to fulfill an order, and accessing a shipping application. Historical activity may also include each operation by itself (without being part of a sequence of operations). The activity data 334 may be anonymized and/or aggregated (e.g., aggregated by user group) and stored in a data facility 134. The activity data 334 associated with the user account 330 and/or activity data stored in the data facility 134 may be analyzed to identify historical activity patterns associated with the user account 330, as discussed further below.

The software platform 1000 also includes a contextual navigation engine 300. The contextual navigation engine 300 includes a contextual reference generator 302, which dynamically generates a contextual reference based on a user's current context.

The contextual reference enables the user to navigate from a current page (e.g., a current page in the administrator for managing one or more aspects of the service instance 320), to a relevant web resource provided by a relevant application. This enables the user to directly navigate to the relevant web resource, without having to navigate through intermediary pages (e.g., a default home page or landing page) of the application and/or without having to enter input data (e.g., manually enter a name of the relevant web resource). The relevant web resource is relevant to a current context of the current page. The current context of the current page may be determined by an attribute of the current page (e.g., determined based on an identifier of the current page) and/or by information or actions that have been selected or inputted on the current page (e.g., input data that have been entered by a user on the current page).

The contextual navigation engine 300 may use a historical activity pattern (e.g., from the activity data 334 associated with the user account 330 and/or historical activity data stored in the data facility 134) to determine that a web resource provided by a particular application is relevant to the current context. A historical activity pattern may be determined using statistical analysis, or using machine learning algorithms, for example. The historical activity pattern may indicate a specific web resource (e.g., identify a specific inner page of a specific application) that is commonly accessed from the current context, for example. In another example, the historical activity pattern may indicate a specific functionality that is commonly accessed from the current context, without identifying a specific web resource or a specific application.

The contextual navigation engine 300 may determine, from the application register 312, an application having an application attribute (e.g., a functionality or output associated with the application in the application register 312) that is relevant to the current context. For example, the contextual navigation engine 300 may determine, from the historical activity pattern, that a specific functionality is commonly accessed from the current context. From the application register 312, the contextual navigation engine 300 may identify a specific registered application having that functionality as an associated attribute, and may identify that application as a relevant application. The contextual navigation engine 300 may thus determine that a web resource of the identified relevant application is relevant to the current context. The contextual reference generator 302 may be used to automatically and dynamically generate a contextual reference for accessing the web resource of the identified relevant application.

The contextual reference generator 302 may dynamically generate a contextual reference, for example using a template, such that the current context and/or the relevant web resource is encoded in the reference itself. For example, if the relevant web resource is an online page that is accessible by a direct uniform resource identifier (URI) or uniform resource locator (URL), the contextual reference generator 302 may generate a contextual reference that is a link to the URI or URL. In some examples, an application that is registered in the application register 312 may be associated with an application attribute that indicates or defines a template that may be used to generate a contextual reference to the URI or URL of a web resource in the application.

In some examples, the contextual reference generator 302 may generate a contextual reference that, when invoked, causes the software platform 1000 to call the relevant application and provide contextual information about the current context to the relevant application. The contextual information may be used by the application to identify the relevant web resource within the application and to navigate to the relevant web resource (e.g., navigate directly to an inner page of the application, bypassing the default landing page).

In some examples, the contextual information that is provided to the application may cause the application to apply a relevant filter to the relevant web resource that affects the information presented to the user in the relevant web resource. For example, the contextual information may indicate that the current context includes a current filter that limits or orders the type of information displayed on the current page. When the contextual reference is invoked, the software platform 1000 includes information about the current filter in the contextual information provided to the application. This causes the application to similarly limit or order the type of information presented in the relevant web resource to match the current context.

In an example in which an aspect of the service instance 320 is an online store, the current context may include: a current page of a store administrator (e.g., an orders page showing all orders, a products page showing all products, or a customers page showing all customers is currently displayed); a current product (e.g., the product page for a specific product is currently displayed); a current order (e.g., the details of a specific order, or the shipping information of a specific order is currently displayed); a current customer profile (e.g., communications with a specific customer is currently displayed); a current marketing or messaging campaign (e.g., parameters of a specific campaign, or history of a specific campaign is currently displayed); user-inputted data (e.g., specifications, description, etc.) of a current product; fulfillment information for a current order (e.g., fulfilling status of a specific order is currently displayed); etc.

As an example of a current filter that is applied in a current page, consider the example where the current page is an orders page for managing an online store. The user may apply a filter to show only orders that need to be shipped (whereas all orders may be shown by default). A relevant web resource may be a page for printing shipping labels, provided by a third-party application (e.g., a plugin from a third-party carrier service). The contextual reference generator 302 may dynamically generate a contextual reference (e.g., a link or button) to enable the user to directly navigate to the relevant web resource, where only the orders that need to be shipped are listed for label printing.

The current context may also include information about one or more previous actions performed on the current page. For example, if a user has performed a previous action to make a change to the current page, this change action may be included in the current context. Consider the example where the current page is a product page for a specific product of an online store. If the user (e.g., an owner or employee of the online store) just updated a product description, then the current context may be determined to include this update. The relevant web resource may be determined to be a page describing the same product on a third-party communication channel (e.g., a social media channel) provided by a third-party application. When the contextual reference is invoked, the updated product description is included in the contextual information provided to the application. The user is able to navigate directly to the page describing the same product, and the product description is automatically populated using the updated product description.

The contextual navigation engine 300 may communicate with an administrator (not shown in FIG. 1) of the software platform 1000 to cause the generated contextual reference to be displayed in the current page of the administrator. The format for displaying the contextual reference may vary. For example, the contextual reference may be displayed as: a one-click button or link provided in a sidebar; a one-click button or link that identifies the relevant web resource (e.g., a contextual reference to navigate to a web resource for calculating shipping rate may be displayed as a button labeled "calculate shipping costs"); or a one-click button or link that identifies the relevant application without identifying the relevant web resource (e.g., contextual reference to navigate to a web resource for marketing a specific product on a third-party channel may be displayed as a button labeled "go to other channel"); among other possibilities.

In some examples, if the relevant application is not already installed against the service instance 320, the contextual reference, when invoked, may further cause the relevant application to be installed against the service instance 320. For example, the contextual navigation engine 300 may identify the relevant application from the application register 312 and the contextual reference may include a reference to the application ID in the application register 312, to cause the relevant application to be installed against the service instance 320.

In some examples, the web resource and application that is relevant to the current context may be determined based on the current context alone without necessarily being also based on a historical activity pattern. For example, if the current page is a product page for a specific product then the current context is the specific product and the relevant web resource may be the product page for the same product on another channel. In some examples, the historical activity pattern associated with the user account 330 of the user may be used to determine the relevant web resource and application. Examples of user account-specific historical activity pattern, which may be used to determine the relevant web resource and application include: a pattern of the web resource and application most commonly called from the current page, a workflow pattern (e.g., a pattern of a sequence of web resources commonly called), or a pattern of a relevant filter most commonly applied on the current page, among other possibilities. The user account-specific historical activity pattern may be determined over a defined time period (e.g., over the page month, over the past year, etc.), which may help to ensure that the determined relevant web resource and application is up-to-date.

As previously noted, the historical activity pattern associated with the user account 330 may be determined from the activity data 334 of the user account 330 and/or may be determined from activity data in the data facility 134. For example, the user account 330 may be associated with a user group, based on a common characteristic (e.g., common age group, common geographical region, common associated service instance 320, common associated category of service instance 320, common amount of experience using the software platform 1000 (e.g., new client on the software platform 1000, or a veteran with more than 5 years' experience on the software platform 1000), etc.) between the user profile 332 and the user group. The anonymized and aggregated (by user group) activity data in the data facility 134 may be analyzed statistically to identify the most common functionality, web resource and/or application that is called from a current context, to determine that a web resource of a particular application is relevant to the current context. In some examples, the activity data that is analyzed to determine the historical activity pattern of a user group may be activity data that is associated with only a subset of the user group. For example, only the activity data associated with successful or highly rated users in the user group (e.g., merchants associated with online stores having above-average sales, or users having high approval rating on the software platform 1000) may be used to determine the historical activity pattern. This may help to ensure that the contextual reference is generated only based on beneficial or useful historical activity patterns, which in turn may help to ensure that the contextual reference enables more efficient use of computing resources on the software platform 1000.

Using the contextual reference generator 302 to automatically and dynamically generate a contextual reference based on historical activity patterns of a user group associated with a user account 330 may be helpful when the user associated with the user account 330 is inexperienced. For example, if the software platform 1000 is an e-commerce platform and an aspect of a service instance 320 that is managed using the software platform 1000 is an online store, a new user may set up a new user account 330 and a new online store on the e-commerce platform. The new user may not know which application or web resource is most useful for performing certain tasks. The contextual reference generator 302 can automatically and dynamically generate a contextual reference, based on historical activity patterns of similar users (e.g., belonging to the same age group, associated with online stores in the same product category, etc.), which may guide the new user to the most useful applications to install when setting up the new online store.

Figure 2:
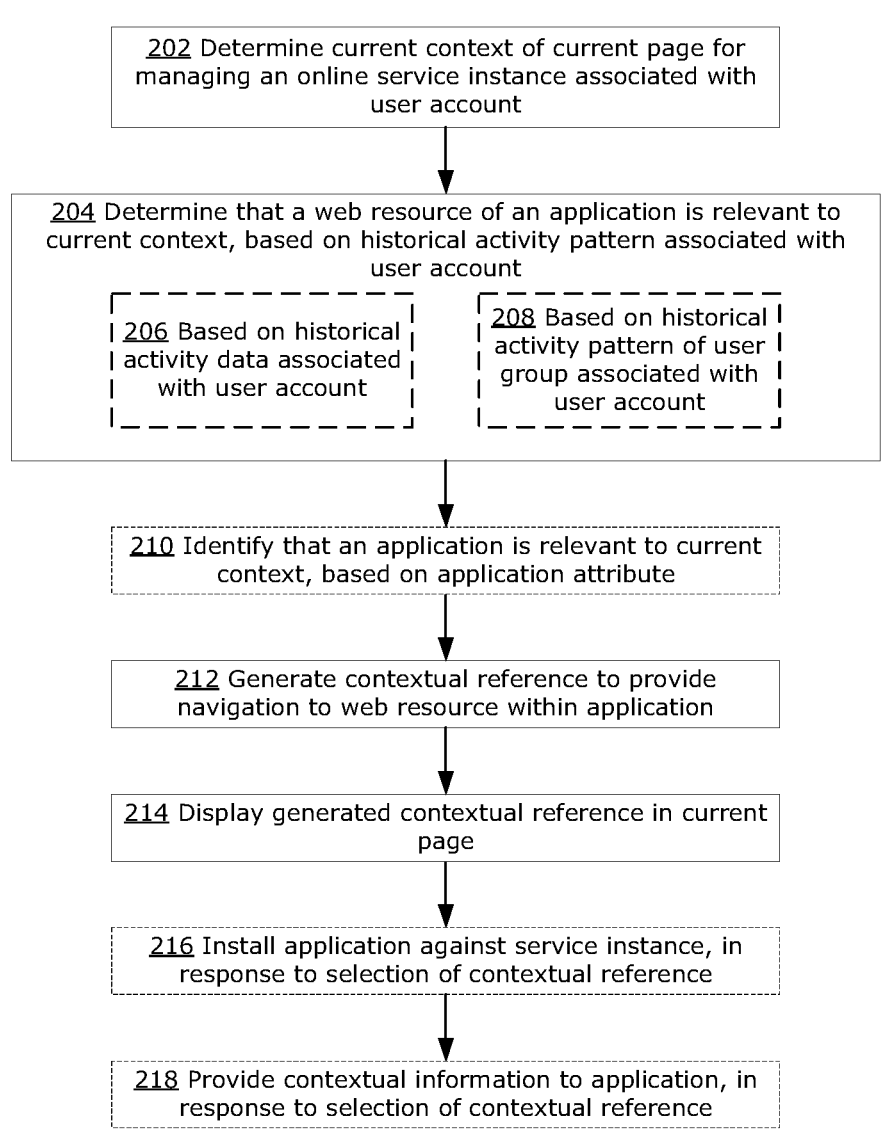
FIG. 2 is a flowchart illustrating an example method for providing contextual navigation, which may be performed by the software platform of FIG. 1.

FIG. 2 is a flowchart illustrating an example method 200, which may be performed by the software platform 1000, using the contextual navigation engine 300.

At an operation 202, a current context of a current page is determined, where the current page is for managing one or more aspects of a service instance 320 on the software platform 1000. The service instance 320 is associated with a user account 330 on the software platform 1000.

At an operation 204, it is determined that a particular web resource of an application (e.g., first-party or third-party application) is relevant to the current context. This determination may be based on a historical activity pattern associated with the user account 330. As depicted in FIG. 2 through the use of stippled lines, one or more optional operations may be employed, alone or in combination, in order to carry out the operation 204. More particularly, as shown in FIG. 2, the operation 204 may be carried out by employing one or more of the operations 206 and/or 208, further described below.

In an example, at an operation 206, the determination that a particular web resource of an application is relevant to the current context may be based on historical activity data associated with the user account 330 (e.g., from activity data 334 associated with the user account 330). For example, statistical analysis of the activity data 334 may be performed to identify the most commonly called functionality, web resource and/or application in the current context, over a defined historical time period (e.g., over the past month, over the past year, etc.). In another example, statistical analysis of the activity data 334 may be performed to identify a pattern of historical page navigation associated with the user account 330, over a defined historical time period.

In another example, at an operation 208, the determination that a particular web resource of an application is relevant to the current context may be based on the historical activity pattern of a user group associated with the user account 330. The user group associated with the user account 330 may be identified based on a common characteristic between the user group and the user profile 332 associated with the user account 330. The historical activity pattern of the identified user group may then be determined using historical activity data stored in the data facility 134, for example.

Example operations 206, 208 illustrate some techniques by which the operation 204 may be carried out. The operations 206, 208 may be performed separately or in combination. It should be understood that other techniques may be used, in addition to or instead of the operations 206, 208. In some examples, machine-learning algorithms may be trained to analyze historical activity data, to identify a relevant functionality, web resource and/or application for a current context.

However the operation 204 is implemented, following the operation 204, optional operation 210 may be performed next.

Optionally, at an operation 210, an application may be identified as being relevant to the current context, based on an application attribute associated with the application. An application attribute may be associated with an application in the application register 312, for example. The application attribute may indicate a functionality or web resource provided by the application that has been determined to be relevant to the current context, and hence the application is relevant to the current context.

At an operation 212, a contextual reference is generated (e.g., using the contextual reference generator 302). The contextual reference is selectable to provide navigation to the particular web resource within the determined relevant application. As previously mentioned, the contextual reference may be a reference (e.g., an URL or URI link) to the relevant web resource and/or may be a mechanism by which contextual information is provided to the relevant application. In some examples, the contextual reference may be generated using a template associated with the relevant application (e.g., a template defined in an application attribute associated with the application), such as by populating a link template using contextual information from the current context.

At an operation 214, the generated contextual reference is displayed in the current page. For example, if the current page is a page provided by an administrator on the software platform 1000, the contextual navigation engine 300 may communicate the generated contextual reference to the administrator to cause the contextual reference to be displayed in the current page. The displayed contextual reference is selectable to provide navigation to the relevant web resource in the relevant application.

Optionally, at an operation 216, in response to selection of the contextual reference, the relevant application may be installed against the service instance 320 (e.g., if the relevant application is not already installed against the service instance 320). The extension points 322 and configuration data 324 of the service instance 320 may be updated accordingly, following the installation.

Optionally, at an operation 218, the contextual reference may be configured to provide contextual information about the current context to the application. For example, in response to selection of the contextual reference, the relevant application may be called, and the contextual information may be provided to the application when the application is called (e.g., the contextual information may be included when the software platform 1000 makes a call to the application). The contextual information, when provided to the application, may cause the application to navigate to the relevant web resource. In some examples, when the application navigates to the relevant web resource responsive to the contextual information, the navigation may be further limited to the current context (e.g., limited to match a current filter applied in the current context).

In some examples, the contextual navigation engine 300 may also perform operations to provide contextual navigation within the software platform 1000. For example, for a user account 330 that is associated with multiple service instances 320 (e.g., multiple stores) and/or multiple aspects of a service instance 320 (e.g., multiple online stores associated with a single store), the contextual navigation engine 300 may enable contextual navigation between the different service instances 320 and/or different aspects of a service instance 320.

The contextual navigation engine 300 may determine a current context from a current page for managing a first aspect of a service instance 320 associated with the user account 330. For example, the current page may provide resources for performing a specific management task for the first aspect of a service instance 320. The contextual reference generator 302 may be used to generate a contextual reference that enables the user to navigate to a relevant page for managing a second aspect of the same or different service instance 320 associated with the user account 330. The relevant page may be determined to be a page that provides resources for performing the same management task for the second aspect.

The relevant page may be determined based on a historical activity pattern associated with the user account 330, as discussed previously. For example, the activity data 334 associated with the user account 330 may indicate that the user most commonly uses a given page for managing aspects of service instances 320. Accordingly, when the current context is a current page for managing a first aspect of a service instance 320, the contextual navigation engine 300 may automatically and dynamically generate a contextual reference that allows the user to navigate directly to the given page for managing a second aspect of a same or different service instance 320. In this way, the user may more efficiently navigate between multiple service instances 320 and/or multiple aspects of a service instance 320 associated with the user account 330, without having to navigate through intermediary pages (e.g., without having to navigate a listing of all applications that have been installed against each service instance 320, without having to navigate through a default home page or landing page for each service instance 320, etc.). This may also result in more efficient use of the resources (e.g., computing resources, memory resources, etc.) of the software platform 1000 since unnecessary intermediary pages do not need to be loaded up and provided to the user.

Consider the example where the software platform 1000 is an e-commerce platform and an aspect of a service instance 320 that is managed on the software platform 1000 is an online store. A user account 330 may be associated with multiple online stores (e.g., different regional store branches). When the user is viewing a particular page, such as the inventory page, for a first online store, the contextual navigation engine 300 may automatically and dynamically generate a contextual reference (e.g., a one-click button) that can be displayed on the current page. Selecting (e.g., clicking) the contextual reference results in the direct navigation to the corresponding page, such as the corresponding inventory page, for a second online store. If the historical activity of the user includes a particular action that was performed on the current page for the first online store, selecting the contextual reference may also result in the same action being performed on the corresponding page for a second online store. For example, if a recent activity on the current inventory page for a first online store is to apply a filter to show only out-of-stock inventory, then selecting the contextual reference may result in navigation to the inventory page for a second online store, where the inventory is also filtered to show only out-of-stock inventory.

In this way, the contextual navigation engine 300 may enable contextual navigation within the software platform 1000, as well as contextual navigation between the software platform 1000 and an application.

As previously mentioned, in some examples the software platform 1000 may be an e-commerce platform. An example e-commerce platform is described below.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 3:
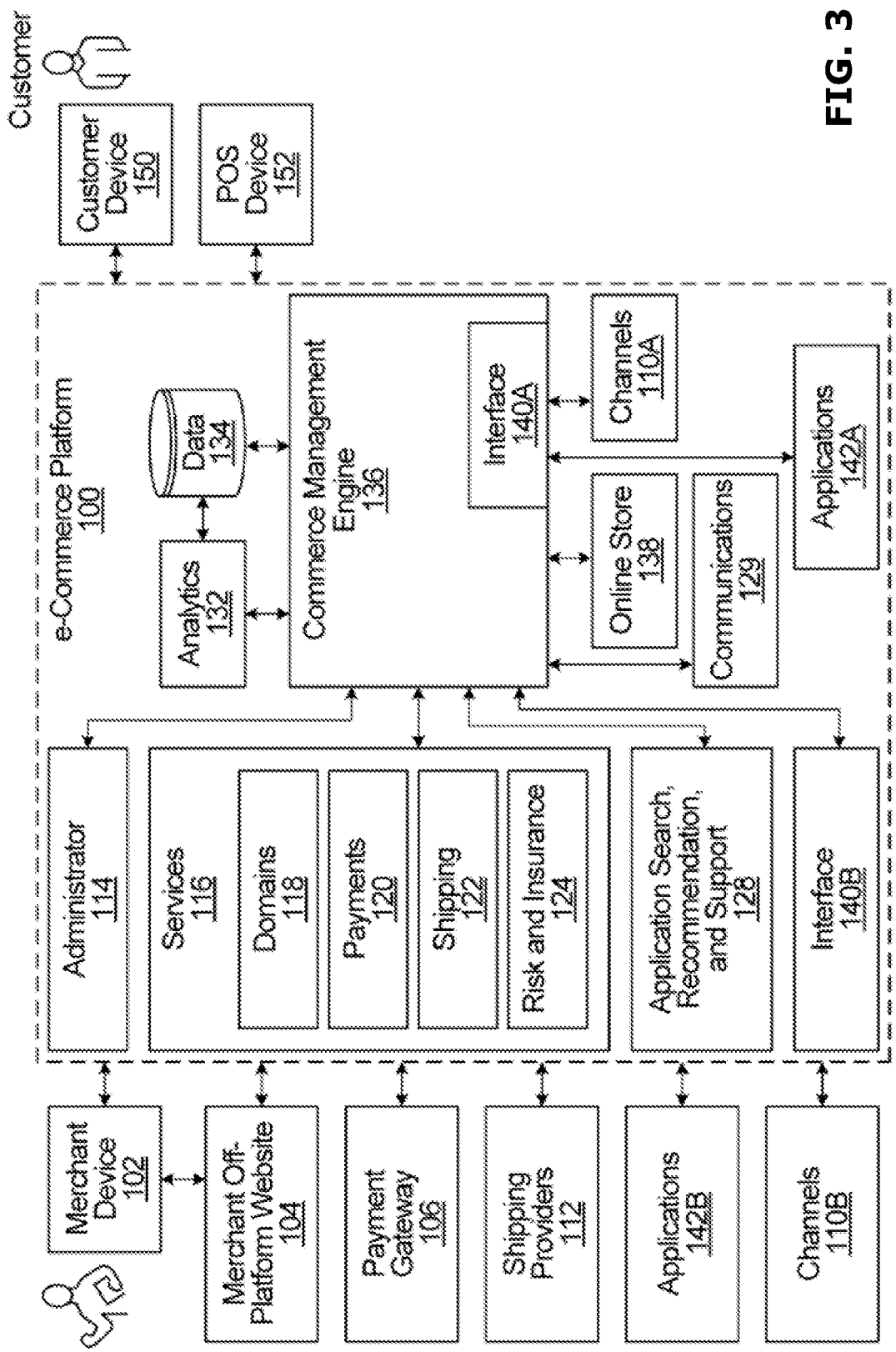
FIG. 3 is a block diagram of an example e-commerce platform, in which examples described herein may be implemented.

FIG. 3 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 3, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol).

The content may be written in machine readable language and may include Hypertext Markup Language (HTML), template language, JavaScript, and the like, and/or any combination thereof.

In some embodiments, online store 138 may be or may include an aspect of a service instance that serves content to customer devices and allows customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 4 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 4. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 3, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

It should be understood that the contextual navigation engine 300 may be included in the e-commerce platform 100, for example as a software engine in communication with at least the commerce management engine 136. The applications manager 310 may also be included in the e-commerce platform 100, for example as a software engine in communication with the applications 142A-B. An aspect of a service instance 320 may be an online store 138 on the e-commerce platform 100. The user account 330 may also be included in the e-commerce platform 100, for example in communication with the data facility 134.

Figure 5A:
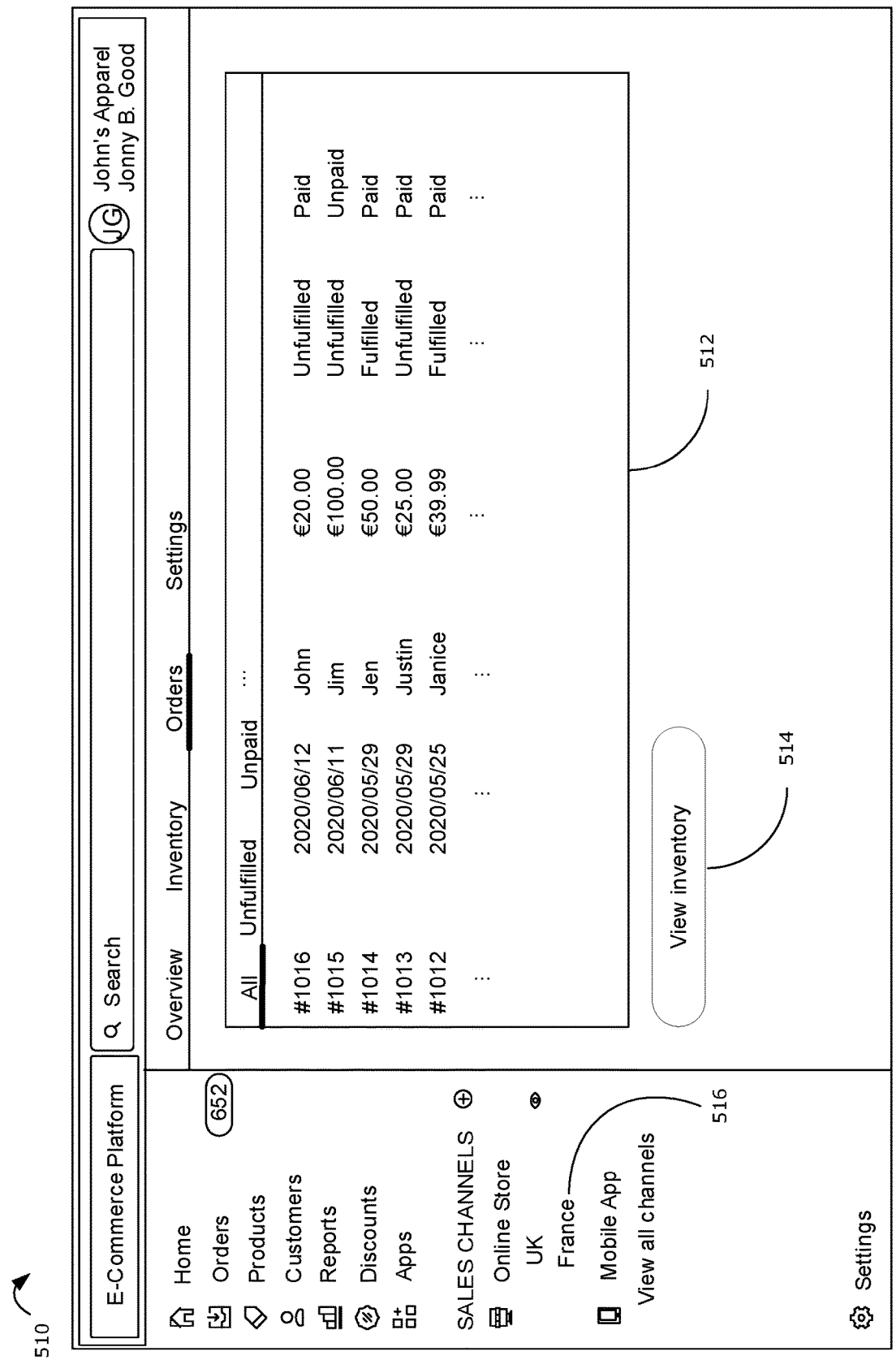
FIGS. 5A-5C illustrate an example implementation of the method of FIG. 2, on a page of an administrator of the e-commerce platform of FIG. 3.
Figure 5B:
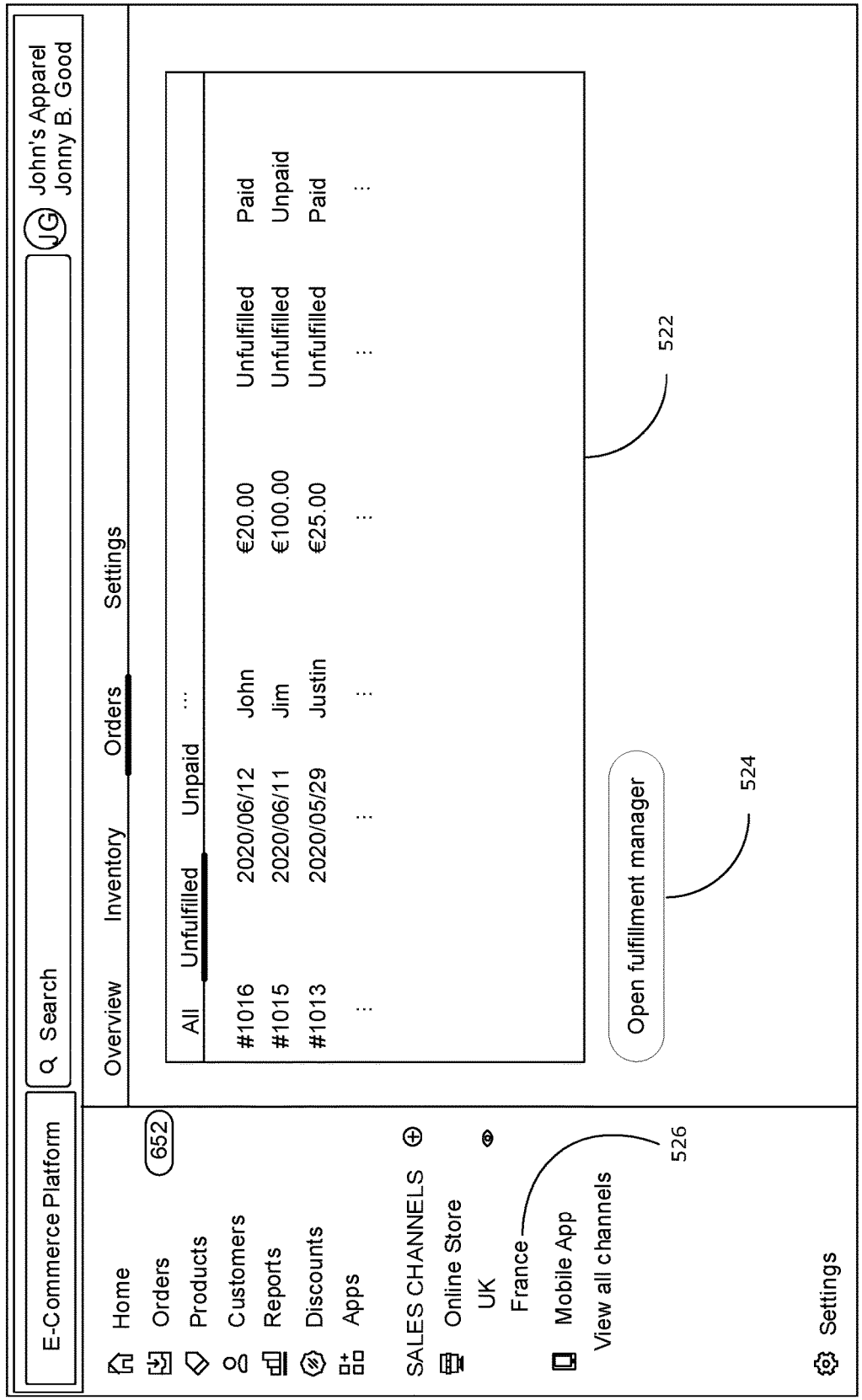
Figure 5C:
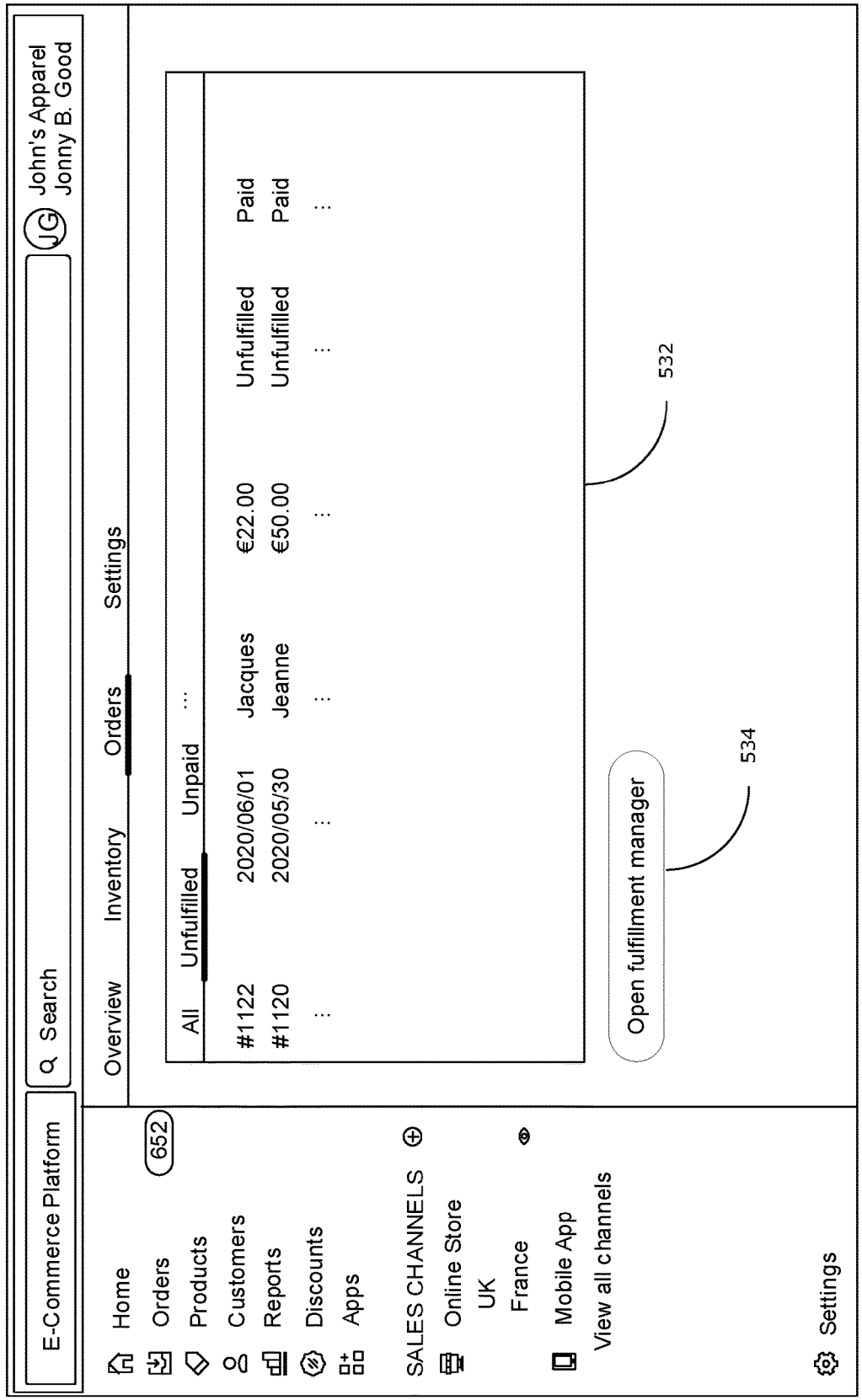

FIGS. 5A-5C illustrate an example implementation of the method 200, in the context of the e-commerce platform 100. In particular, FIGS. 5A-5C illustrate an example of how the method 200 may be performed to generate and display contextual references in pages of an administrator 114 for an online store 138.

FIG. 5A shows an example orders page 510 of the administrator 114. In particular, the orders page 510 shows a list 512 of all orders for a first online store 138 (in this example, a UK store branch) associated with a user account 330. The contextual navigation engine 300 may determine that the current context is all orders of the online store 138. Based on the current context and a historical activity pattern associated with the user account 330, the contextual navigation engine 300 may determine that a web resource of an inventory management application is relevant to the current context. The contextual navigation engine 300 may automatically and dynamically generate a contextual reference, such as a button 514, to navigate to a web resource of the inventory management application. Selection of the button 514 may enable the user to directly navigate to the web resource for managing inventory for the first online store 138. In this example, the user account 330 is also associated with a second online store 138 (in this example, a France store branch). Based on the current context and a historical activity pattern associated with the user account 330, the contextual navigation engine 300 may also determine that the orders page for the second line store 138 is also relevant to the current context. The contextual navigation engine 300 may automatically and dynamically generate a contextual reference to navigate to the corresponding orders page for the second online store 138, such as a link 516 in the sidebar.

FIG. 5B shows an example orders page 520, in which a filter has been applied such that the list 522 of orders shows only unfulfilled orders for the first online store 138. The contextual navigation engine 300 may determine that the current context is unfulfilled orders of the online store 138. Based on the current context and a historical activity pattern associated with the user account 330, the contextual navigation engine 300 may determine that a web resource of a fulfillment management application is relevant to the current context. The contextual navigation engine 300 may automatically and dynamically generate a contextual reference, such as a button 524, to navigate to a web resource of the fulfillment management application. Selection of the button 524 may enable the user to directly navigate to the relevant web resource for managing order fulfillment for the first online store 138. It may be noted that, because the current context is changed from the orders page 510 of FIG. 5A (specifically, the current context has been changed from all orders to unfulfilled orders only), the contextual reference has also been dynamically changed. The contextual reference to navigate to the corresponding orders page for the second online store 138, such as the link 526 in the sidebar, may also be changed to navigate to a view of only the unfulfilled orders for the second online store 138.

FIG. 5C shows an example orders page 530, which may be displayed as a result of selecting the link 526. When the link 526 is selected in the orders page 520 of FIG. 5B, the user directly navigates to the corresponding orders page 530 for the second online store 138, without having to navigate through intermediary pages (e.g., an overview page or landing page) of the second online store 138. Further, because the current context in the orders page 520 is unfulfilled orders, the orders page 530 of FIG. 5C shows a list 532 that is also limited to only unfulfilled orders for the second online store 138. Based on the current context and a historical activity pattern associated with the user account 330, the contextual navigation engine 300 may determine that a web resource of a fulfillment management application is relevant to the current context. The contextual navigation engine 300 may automatically and dynamically generate a contextual reference, such as a button 534, to navigate to a web resource of the fulfillment management application. Selection of the button 534 may enable the user to directly navigate to the relevant web resource for managing order fulfillment for the second online store 138 (rather than the first online store 138). For example, selection of the button 534 may cause the e-commerce platform 100 to automatically provide the fulfillment management application with contextual information indicating that the context is the second online store 138 (rather than the first online store 138), to cause the application to directly navigate to the web resource for fulfilling orders for the second online store 138.

In various examples, the present disclosure has described methods and systems that enable contextual navigation between a software platform and an application. In some examples, the present disclosure enables a software platform to provide contextual navigation directly to a web resource (e.g., an inner page) of an application (including a first-party application or a third-party application), without having to navigate through a default home page or landing page of the application. The software platform may use information in an application register to generate a contextual reference to the web resource of the application. For example, an application may be registered with associated application attributes, including a definition of what the application can accept as contextual information and/or a definition of a template that can be used to generate a contextual reference for contextual navigation within the application.

In various examples, the present disclosure also describes methods and systems that use historical activity patterns to determine that a web resource of an application is relevant to a current context, and to generate a contextual reference to navigate to that web resource. In some examples, the present disclosure may use the historical activity pattern of a user group (to which a current user belongs), to determine that a web resource of an application is relevant to a current context being used by the user. In this way, a relevant application that has been commonly used by similar users may be used to generate a contextual reference to a current user. This may enable a current user, who may be less experienced, to benefit and learn from the experience of other similar users. This may also enable a less experienced user to identify (and install) a relevant application, based on the experience of other users. This can be more useful than a generic tutorial because the contextual reference is generated in the context of the user's current page. Further, the contextual reference can be dynamically generated based on the up-to-date activity pattern of other users in the user group.

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for providing contextual navigation on a software platform, the method comprising:
  determining a current context of a current page for managing one or more aspects of a service instance on the software platform, the service instance being associated with a user account, the current context including an action currently applied to the current page;
  determining that a particular web resource of an application is relevant to the current context based on analysis of a historical activity pattern associated with a user group associated with the user account, the analysis indicating that the particular web resource is a commonly accessed web resource from the current context;
  generating, by the software platform, a contextual reference to the particular web resource, the contextual reference being selectable to cause the software platform to provide contextual information about the current context including the action currently applied to the current page to the application, to cause the application to navigate to the particular web resource within the application and to apply the action to the particular web resource; and displaying the contextual reference in the current page.

2. The method of claim 1, further comprising:

determining, based on a plurality of application attributes associated with a respective plurality of applications registered on the software platform, that an application attribute associated with a given application is relevant to the current context; and responsive to determining that the application attribute associated with the given application is relevant to the current context, providing an indication that the given application is also relevant to the current context.

3. The method of claim 2, wherein the contextual reference is further selectable to install the given application against the service instance.

4. The method of claim 1, wherein generating the contextual reference comprises:

generating a direct uniform resource identifier (URI) or uniform resource locator (URL) link to access the particular web resource.

5. The method of claim 4, wherein the URI or URL link is generated using a template associated with the application, by populating the template using contextual information about the current context.

6. The method of claim 1, wherein the current context of the current page is determined to further include:

a current product;
a current order;
a current customer profile;
a current marketing campaign;
specifications of a current product; or
fulfillment information for a current order.

7. The method of claim 1, further comprising:

determining the historical activity pattern associated with the user group associated with the user account based on historical activity over a defined time period.

8. The method of claim 1, wherein the analysis of the historical activity pattern associated with the user group associated with the user account is statistical analysis of the historical activity pattern over a defined time period.

9. The method of claim 1, wherein the action currently applied to the current page is a filter applied to the current page, and wherein the contextual reference is selectable to cause the software platform to provide contextual information about the filter, to cause the application to apply a corresponding filter to the particular web resource.

10. The method of claim 1, wherein the action currently applied to the current page is an information update applied to the current page, and wherein the contextual reference is selectable to cause the software platform to provide contextual information about the information update, to cause the application to apply a corresponding information update to the particular web resource.

11. The method of claim 1, wherein the user group is associated with the user account based on a common characteristic between the user group and a user profile of the user account.

12. The method of claim 1, wherein the historical activity pattern associated with the user group is based on activity data associated with users having above-average sales in the user group.

13. A system for providing contextual navigation on a software platform, the system comprising:

a hardware processor in communication with storage, the hardware processor configured to execute instructions from the storage to cause the system to:

determine a current context of a current page for managing one or more aspects of a service instance on the software platform, the service instance being associated with a user account, the current context including an action currently applied to the current page;

determine that a particular web resource of an application is relevant to the current context based on analysis of a historical activity pattern associated with a user group associated with the user account, the analysis indicating that the particular web resource is a commonly accessed web resource from the current context;

generate a contextual reference to the particular web resource, the contextual reference being selectable to cause the software platform to provide contextual information about the current context including the action currently applied to the current page to the application, to cause the application to navigate to the particular web resource within the application and to apply the action to the particular web resource; and display the contextual reference in the current page.

14. The system of claim 13, wherein the hardware processor is configured to execute instructions to further cause the system to:

determine, based on a plurality of application attributes associated with a respective plurality of applications registered on the software platform, that an application attribute associated with a given application is relevant to the current context; and responsive to determining that the application attribute associated with the given application is relevant to the current context, provide an indication that the given application is also relevant to the current context.

15. The system of claim 14, wherein the contextual reference is further selectable to install the given application against the service instance.

16. The system of claim 13, wherein the hardware processor is configured to execute instructions to further cause the system to generate the contextual reference by:

generating a direct uniform resource identifier (URI) or uniform resource locator (URL) link to access the particular web resource.

17. The system of claim 16, wherein the URI or URL link is generated using a template associated with the application, by populating the template using contextual information about the current context.

18. The system of claim 13, wherein the hardware processor is configured to execute instructions to further cause the system to:

determine the historical activity pattern associated with the user group associated with the user account based on historical activity over a defined time period.

19. A non-transitory computer-readable medium storing instructions that, when executed by a hardware processor of a system, cause the system to:

determine a current context of a current page for managing one or more aspects of a service instance on a software platform, the service instance being associated with a user account, the current context including an action currently applied to the current page;

determine that a particular web resource of an application is relevant to the current context based on analysis of a historical activity pattern associated with a user group associated with the user account, the analysis indicating that the particular web resource is a commonly accessed web resource from the current context;

generate a contextual reference to the particular web resource, the contextual reference being selectable to cause the software platform to provide contextual information about the current context including the action currently applied to the current page to the application, to cause the application to navigate to the particular web resource within the application and to apply the action to the particular web resource; and display the contextual reference in the current page.

20. The non-transitory computer readable medium of claim 19, wherein the instructions further cause the system to:

determine, based on a plurality of application attributes associated with a respective plurality of applications registered on the software platform, that an application attribute associated with a given application is relevant to the current context; and responsive to determining that the application attribute associated with the given application is relevant to the current context, provide an indication that the given application is also relevant to the current context.

21. The non-transitory computer readable medium of claim 20, wherein the contextual reference is further selectable to install the given application against the service instance.

\* \* \* \* \*